United States Patent
Fagan et al.

(10) Patent No.: US 9,650,141 B2
(45) Date of Patent: May 16, 2017

(54) SYSTEM AND A METHOD OF OPERATION OF THE SYSTEM INCORPORATING A GRAPHICAL USER INTERFACE IN A BULKHEAD OF A VEHICLE CABIN

(71) Applicant: BOMBARDIER INC., Dorval (CA)

(72) Inventors: Tim Michael Fagan, Beaconsfield, CA (US); Brian Conner, Seattle, WA (US); Jeff Bartenbach, Seattle, WA (US); Linsey Nancarrow, Seattle, WA (US); Tom Hobbs, Seattle, WA (US); Erick Waldman, Seattle, WA (US); Sebastian Petry, Seattle, WA (US)

(73) Assignee: BOMBARDIER INC., Dorval, Quebec (CA)

( * ) Notice: Subject to any disclaimer, the term of this patent is extended or adjusted under 35 U.S.C. 154(b) by 0 days.

(21) Appl. No.: 14/164,932

(22) Filed: Jan. 27, 2014

(65) Prior Publication Data
US 2016/0059953 A1    Mar. 3, 2016

Related U.S. Application Data

(60) Provisional application No. 61/759,146, filed on Jan. 31, 2013.

(51) Int. Cl.
*B64D 11/00* (2006.01)
*B64D 13/06* (2006.01)

(52) U.S. Cl.
CPC .. *B64D 11/0015* (2013.01); *B60K 2350/1024* (2013.01); *B64D 2013/0655* (2013.01)

(58) Field of Classification Search
CPC ........ B60K 2350/1024; B64D 11/0015; B64D 11/00155; B64D 2011/0053; B64D 2013/0655

(Continued)

(56) References Cited

U.S. PATENT DOCUMENTS 4,501,013 A    2/1985  Sato
5,555,458 A *  9/1996  Large .............................. 340/945

(Continued)

FOREIGN PATENT DOCUMENTS

DE    102006006363 A1 *  8/2007
DE    102007043379 A1 *  4/2009  ............. B60K 37/06

(Continued)

OTHER PUBLICATIONS

Frequent Flying, "Vintage Airline Seat Map Eastern Air Lines Boeing 727-100", Jan. 18, 2012, 2 pages, downloaded from http://frequentlyflying.boardingarea.com/vintage-airline-seat-map-eastern-air-lines-boeing-727-100/.*

(Continued)

*Primary Examiner* — Behrang Badii
*Assistant Examiner* — David Testardi
(74) *Attorney, Agent, or Firm* — Karceski IP Law, PLLC

(57) ABSTRACT

A method of operation for a system incorporating a graphical user interface disposed in a bulkhead within a cabin of an aircraft. The method includes displaying a menu for at least one controllable parameter, receiving a selection of the controllable parameter, displaying at least one control for the selected controllable parameter, receiving a control input for the selected controllable parameter, and adjusting the selected controllable parameter consistent with the control input. The controllable parameter may be one from a plurality of controllable parameters selected from a group that includes cabin light intensity, cabin light color, temperature, and the degree of openness of at least one window shade. A system and an executable computer program product also are provided.

26 Claims, 14 Drawing Sheets

(58) Field of Classification Search
USPC .......................................................... 701/3
See application file for complete search history.

(56) References Cited

U.S. PATENT DOCUMENTS

| | | | |
|---|---|---|---|
| 6,249,913 B1 | 6/2001 | Galipeau et al. | |
| 6,343,127 B1* | 1/2002 | Billoud | 381/71.4 |
| 6,448,907 B1* | 9/2002 | Naclerio | 340/945 |
| 6,988,246 B2* | 1/2006 | Kopitzke | B64D 11/00 244/118.5 |
| 7,114,171 B2 | 9/2006 | Brady, Jr. et al. | |
| 7,500,716 B2 | 3/2009 | Guerin et al. | |
| 7,509,587 B2 | 3/2009 | Kopitzke et al. | |
| 7,878,586 B2 | 2/2011 | Kneller et al. | |
| 7,908,158 B2 | 3/2011 | Stirlen et al. | |
| 8,037,500 B2 | 10/2011 | Margis et al. | |
| 8,065,463 B2 | 11/2011 | Porath et al. | |
| 8,082,569 B2 | 12/2011 | Brady, Jr. et al. | |
| 8,380,393 B1* | 2/2013 | Ohtomo | 701/36 |
| 8,613,385 B1 | 12/2013 | Hulet et al. | |
| 2001/0023499 A1* | 9/2001 | Wakahara | 725/143 |
| 2003/0132345 A1 | 7/2003 | Lehmann | |
| 2004/0139467 A1 | 7/2004 | Rogerson et al. | |
| 2004/0145612 A1 | 7/2004 | Kopitzke et al. | |
| 2005/0001838 A1 | 1/2005 | Gregorio et al. | |
| 2005/0002198 A1* | 1/2005 | Blechschmidt | B64D 11/00 362/470 |
| 2005/0018172 A1 | 1/2005 | Gelfond et al. | |
| 2005/0039305 A1 | 2/2005 | Chirumbolo | |
| 2005/0121978 A1 | 6/2005 | McAvoy | |
| 2005/0185399 A1* | 8/2005 | Beermann et al. | 362/231 |
| 2005/0280524 A1* | 12/2005 | Boone et al. | 340/461 |
| 2006/0045107 A1 | 3/2006 | Kucenas et al. | |
| 2006/0092129 A1 | 5/2006 | Choquet et al. | |
| 2006/0099959 A1 | 5/2006 | Staton et al. | |
| 2006/0155429 A1* | 7/2006 | Boone et al. | 701/1 |
| 2007/0061847 A1 | 3/2007 | Callahan et al. | |
| 2007/0107277 A1* | 5/2007 | Simms et al. | 40/320 |
| 2007/0141899 A1 | 6/2007 | Saini et al. | |
| 2007/0179737 A1 | 8/2007 | Kalokitis et al. | |
| 2007/0236926 A1* | 10/2007 | Guard et al. | 362/228 |
| 2008/0055836 A1 | 3/2008 | Lamoree et al. | |
| 2008/0104642 A1 | 5/2008 | Galipeau et al. | |
| 2008/0144158 A1 | 6/2008 | Stavaeus et al. | |
| 2008/0157997 A1 | 7/2008 | Bleacher et al. | |
| 2008/0230653 A1* | 9/2008 | Mitchell et al. | 244/129.3 |
| 2008/0234893 A1 | 9/2008 | Mitchell et al. | |
| 2009/0079705 A1 | 3/2009 | Sizelove et al. | |
| 2009/0083805 A1* | 3/2009 | Sizelove et al. | 725/76 |
| 2009/0109036 A1* | 4/2009 | Schalla et al. | 340/573.1 |
| 2009/0112638 A1 | 4/2009 | Kneller et al. | |
| 2009/0113494 A1* | 4/2009 | Weidel | B64D 45/0015 725/76 |
| 2009/0119431 A1 | 5/2009 | Porath et al. | |
| 2009/0206070 A1 | 8/2009 | Ortner et al. | |
| 2009/0249408 A1 | 10/2009 | Smallhorn | |
| 2009/0288123 A1 | 11/2009 | Havlovick et al. | |
| 2009/0319902 A1 | 12/2009 | Kneller et al. | |
| 2010/0060736 A1 | 3/2010 | Shi et al. | |
| 2010/0060739 A1 | 3/2010 | Salazar | |
| 2010/0064327 A1 | 3/2010 | Lynch et al. | |
| 2010/0070089 A1 | 3/2010 | Harrod et al. | |
| 2010/0159879 A1 | 6/2010 | Salkini et al. | |
| 2010/0176632 A1 | 7/2010 | Alford et al. | |
| 2010/0187354 A1 | 7/2010 | Helfrich | |
| 2010/0193633 A1* | 8/2010 | Budinger | B64C 1/18 244/118.5 |
| 2010/0313146 A1 | 12/2010 | Nielsen et al. | |
| 2011/0004832 A1 | 1/2011 | Canal et al. | |
| 2011/0082616 A1* | 4/2011 | Small et al. | 701/29 |
| 2011/0126242 A1 | 5/2011 | Cline et al. | |
| 2011/0162015 A1 | 6/2011 | Holyoake et al. | |
| 2011/0164429 A1 | 7/2011 | Heym et al. | |
| 2011/0174926 A1* | 7/2011 | Margis et al. | 244/118.6 |
| 2012/0060524 A1 | 3/2012 | Al-Ali | |
| 2012/0110517 A1 | 5/2012 | Sparks et al. | |
| 2012/0130547 A1 | 5/2012 | Fadell et al. | |
| 2012/0131504 A1 | 5/2012 | Fadell et al. | |
| 2012/0132746 A1 | 5/2012 | Sizelove | |
| 2012/0254932 A1 | 10/2012 | Hudson et al. | |
| 2013/0005336 A1 | 1/2013 | Ayotte et al. | |
| 2013/0027954 A1 | 1/2013 | Boomgarden et al. | |
| 2013/0063340 A1 | 3/2013 | Mondragon et al. | |
| 2013/0093220 A1 | 4/2013 | Pajic | |
| 2013/0161971 A1 | 6/2013 | Bugno et al. | |
| 2013/0185662 A1* | 7/2013 | Quattrocolo et al. | 715/764 |
| 2013/0235000 A1 | 9/2013 | Lee et al. | |
| 2013/0290902 A1 | 10/2013 | Martin et al. | |
| 2014/0067208 A1 | 3/2014 | Klappert et al. | |
| 2014/0085337 A1 | 3/2014 | Velten et al. | |
| 2014/0109080 A1 | 4/2014 | Ricci | |
| 2014/0239677 A1 | 8/2014 | Laib et al. | |
| 2014/0309868 A1 | 10/2014 | Ricci | |
| 2014/0324299 A1 | 10/2014 | Sorensen | |
| 2015/0058777 A1 | 2/2015 | Graumann et al. | |
| 2015/0253750 A1 | 9/2015 | Eronen et al. | |
| 2015/0261379 A1 | 9/2015 | Kneuper et al. | |

FOREIGN PATENT DOCUMENTS

| | | | |
|---|---|---|---|
| DE | 102011112944 A1 | 3/2013 | |
| JP | 2003182351 A * | 7/2003 | B60H 3/00 |
| WO | WO 0052550 A2 | 9/2000 | |
| WO | WO 2009062974 A1 | 5/2009 | |

OTHER PUBLICATIONS

Rockwell Collins, "Bombardier CES HD" brochure, 147-1351-000 10/11, © 2011 Rockwell Collins Inc, 8 pages.*

Rosen Aviation, "Ultra CMS Technical Manual," Revision Date Mar. 11, 2010, Copyright 2010, Document No. 102350 A, 28 pages.*

Honeywell "Ovation Select 200C Personal Control Unit" brochure, A60-1090-000-000, Mar. 2009, © 2009 Honeywell International Inc., 4 pages.*

Airliners.Net, "A320 FWD Flight Attendant Panel" Tech Ops Forum, posted Mar. 17, 2007, 7 pages, downloaded from: http://www.airliners.net/aviationforums/tech_ops/read.main/186678/.*

Airbus, "US Airways Flight 1549 A320-214 N106US Landing on the Hudson River", report submitted to the NTSB on Jan. 15, 2009, 54 pages.*

Elo Touch Solutions, "Touch is in the air" (describing and depicting a Flight Attendant Panel), Google date: Oct. 3, 2006, 2 pages, downloaded from: http://www.elotouch.com/Solutions/Transportation/air.asp.*

Heller, Christoph et al., "Spectrum Sensing for Congitive Wireless Applications inside Aircraft Cabins," 31st IEEE/AIAA Digital Avionics Systems Conference (DASC), Oct. 14-18, 2012, pp. 7E2-1-7E2-9.*

Airbus 319 seat map (8/120 configuration), United Airlines, Copyright 2015 United Airlines, 1 page.*

Airbus, "Single aisle technical training manual maintenance course: T1 Lights", select pages (pp. 1, 2, 4-6, 16-20, back cover), Oct. 2005, 13 pages.*

Frequent Flying, "Vintage airline seat map: American Airlines Boeing 727-200 from 1985", Jan. 4, 2013, 6 pages, downloaded from: http://frequentlyflying.boardingarea.com/vintage-airline-seat-map-american-airlines-boeing-727-200-from-1985/.*

JetPhotos.Net, "Airbus A320-232" bulkhead photo, United Airlines, Serial # 503, Mar. 5, 2003, 2 pages, downloaded from: http://www.jetphotos.net/photo/109418.*

SeatGuru, "Bulkheads explained: pros and cons", Internet Archive record of https://www.seatguru.com/articles/bulkheads.php from Jan. 30, 2012, 1 page.*

Woods, Martin, "The A318: Enhancing the A320 Family", in FAST29, Airbus Technical Digest, Dec. 2001, pp. 8-13.*

YouTube Screen Shots, "Enhanced Fap—Airbus 320", uploaded by cesar soto on Sep. 12, 2007 at https://www.youtube.com/watch?v=IW8ql_3NUjg , 3 pages.*

(56) References Cited

OTHER PUBLICATIONS

International Search Report and Written Opinion dated Jul. 25, 2016, for International Patent Application No. PCT/IB2015/0059051.
International Search Report and Written Opinion dated Jul. 27 2016, for International Patent Application No. PCT/IB2015/0059049.
International Search Report and Written Opinion dated Aug. 2, 2016, for International Patent Application No. PCT/IB2015/0059050.
International Search Report and Written Opinion dated Aug. 3, 2016, for International Patent Application No. PCT/IB2015/0059052.
International Search Report and Written Opinion dated Sep. 23, 2016, for International Patent Application No. PCT/IB2015/0059053.

* cited by examiner

SYSTEM AND A METHOD OF OPERATION OF THE SYSTEM INCORPORATING A GRAPHICAL USER INTERFACE IN A BULKHEAD OF A VEHICLE CABIN

CROSS-REFERENCE TO RELATED APPLICATION(S)

This is a United States Non-Provisional Patent Application that relies for priority on U.S. Provisional Patent Application Ser. No. 61/759,146, filed on Jan. 31, 2013, the entire contents of which are incorporated herein by reference.

FIELD OF THE INVENTION

The present patent application is directed to a system and a method of operation of a system incorporating a graphical user interface that is positioned in a bulkhead of a vehicle cabin (also referred to herein as a "bulkhead GUI," "bulkhead input/output node," or "bulkhead IO node"). The bulkhead IO node provides control over one or more functions within the cabin of the vehicle. The vehicle may be an aircraft.

DESCRIPTION OF THE RELATED ART

As should be apparent to those skilled in the art, there are a number of functions that may be controlled within the cabin of an aircraft. The functions may be divided into at least two categories: (1) functions related to environment, and (2) functions related to passenger comfort and entertainment.

Environmental functions include, but are not limited to, things such as cabin temperature, the intensity of the cabin lighting, and the degree to which the window shades are open, among other variables.

Functions related to passenger comfort include those related to actuation of a personal reading light, control over the air flow through an overhead vent, positioning of the passenger seat (i.e., upright or reclined), and a remote call for a flight attendant (i.e., a flight attendant call button).

Other functions that are associated with passenger comfort include, but are not limited to control over media type (i.e., audio and/or video), content, and volume. With respect to content, selectivity may be provided so that a passenger may select a genre of music (i.e., jazz music or pop music) or a genre of movies (i.e., comedy or drama), among other variations. As should be apparent to any passenger, individuals may control the volume of the media that has been selected.

At present, selected the environmental functions typically are adjusted by the flight crew for the comfort of all passengers within the aircraft. For example, temperature typically is controlled at a central location within the aircraft cabin, via a thermostat or similar temperature control device. Similarly, the main cabin lighting in the aircraft typically is controlled via a central panel available to the flight crew. As a result, the flight crew can turn on, turn off, or dim the main lights within the aircraft cabin for all of the passengers.

As should be apparent to the airplane traveler, functions associated with passenger comfort and entertainment typically are accessible directly from the passenger's seat.

This basic operational approach to aircraft cabin functions has been employed for many years. As presently configured, the control systems for the environment and for passenger comfort and entertainment within an aircraft operate independently from one another.

Recently, a desire has developed to improve the manner in which aircraft cabin functions are controlled. Specifically, a desire has arisen to develop controls for one or more functions within the cabin of an aircraft from one or more consolidated IO nodes.

SUMMARY OF THE INVENTION

The present invention provides a GUI and a method of operation of a GUI that is disposed within a bulkhead in an aircraft.

The present invention provides for a method of operation for a system incorporating a graphical user interface disposed in a bulkhead within a cabin of an aircraft. The method includes displaying a menu for at least one controllable parameter, receiving a selection of the controllable parameter, displaying at least one control for the selected controllable parameter, receiving a control input for the selected controllable parameter, and adjusting the selected controllable parameter consistent with the control input. The controllable parameter may be one from a plurality of controllable parameters selected from a group that includes cabin light intensity, cabin light color, temperature, and the degree of openness of at least one window shade.

With regard to the method, the bulkhead may be at least one interior wall within the cabin of the aircraft.

It is contemplated that the method may include placing the bulkhead graphical user interface into a sleep mode if selection of a controllable parameter is not received.

In connection with the method, it is contemplated that the plurality of controllable parameters may be associated with at least one of the entire cabin of the aircraft, at least one zone within the cabin of the aircraft, or at least one seat within the cabin of the aircraft.

The method may include prioritizing the control input received from the bulkhead graphical user interface in relation to control inputs received from any other input device, thereby avoiding conflicts between the control inputs.

In the method, cabin light intensity, temperature, and degree of openness of the at least one window shade may be adjustable between a predetermined minimum and a predetermined maximum. Light color may be adjustable between a predetermined warm color and a predetermined cool color.

It is also contemplated that the displaying of the menu for the controllable parameter includes displaying a cabin light icon, a thermostat icon, and a window shade icon.

The present invention also provides for a system incorporating a graphical user interface disposed in a bulkhead within a cabin of an aircraft. The system encompasses a first display for displaying at least one controllable parameter, an input for receiving a selection of the controllable parameter, a second display for displaying at least one control for the selected controllable parameter, wherein the input receives a control input for the selected controllable parameter, and a controller for adjusting the selected controllable parameter consistent with the control input. The controllable parameter may be one of a plurality of controllable parameters selected from a group including cabin light intensity, cabin light color, temperature, and the degree of openness of at least one window shade.

With respect to the system, it is contemplated that the bulkhead is at least one interior wall within the cabin of the aircraft.

It is also contemplated for the system that the bulkhead graphical user interface is touch sensitive, permitting selection of the controllable parameter.

In the system, the plurality of controllable parameters may be associated with at least one of the entire cabin of the aircraft, at least one zone within the cabin of the aircraft, or at least one seat within the cabin of the aircraft.

Also with respect to the system, the controller may prioritize the control input received from the bulkhead graphical user interface in relation to control inputs received from any other input device, thereby avoiding conflicts between the control inputs.

It is also contemplated, with respect to the system, that the plurality of controllable parameters are associated with at least one of the entire cabin of the aircraft, at least one zone within the cabin of the aircraft, or at least one seat within the cabin of the aircraft.

The present invention also provides for an executable computer program product providing instructions for a method of operation of a system incorporating a graphical user interface disposed in a bulkhead within a cabin of a vehicle. The instructions include displaying a menu for at least one controllable parameter, receiving a selection of the controllable parameter, displaying at least one control for the selected controllable parameter, receiving a control input for the selected controllable parameter, and adjusting the selected controllable parameter consistent with the control input. The controllable parameter includes a plurality of controllable parameters selected from a group comprising cabin light intensity, cabin light color, temperature, and the degree of openness of at least one window shade.

With respect to the executable computer program product, the bulkhead is contemplated to be at least one interior wall within the cabin of the aircraft.

In the executable computer program product, the instructions may include placing the bulkhead graphical user interface into a sleep mode if selection of a controllable parameter is not received.

It is also contemplated that, for the executable computer program product, the plurality of controllable parameters are associated with at least one of the entire cabin of the aircraft, at least one zone within the cabin of the aircraft, or at least one seat within the cabin of the aircraft.

In addition, the executable computer program product may include instructions to prioritize the control input received from the bulkhead graphical user interface in relation to control inputs received from any other input device, thereby avoiding conflicts between the control inputs.

In one contemplated embodiment, the bulkhead IO node provides to users (whether flight crew, passengers, or other individuals) control over one or more functions within an aircraft cabin.

Still further aspects of the present invention will be made apparent from the drawings and description that follows.

BRIEF DESCRIPTION OF THE DRAWINGS

The present invention will now be described in connection with the figures appended hereto, in which.

DETAILED DESCRIPTION OF EMBODIMENT(S) OF THE PRESENT INVENTION

Figure 1:
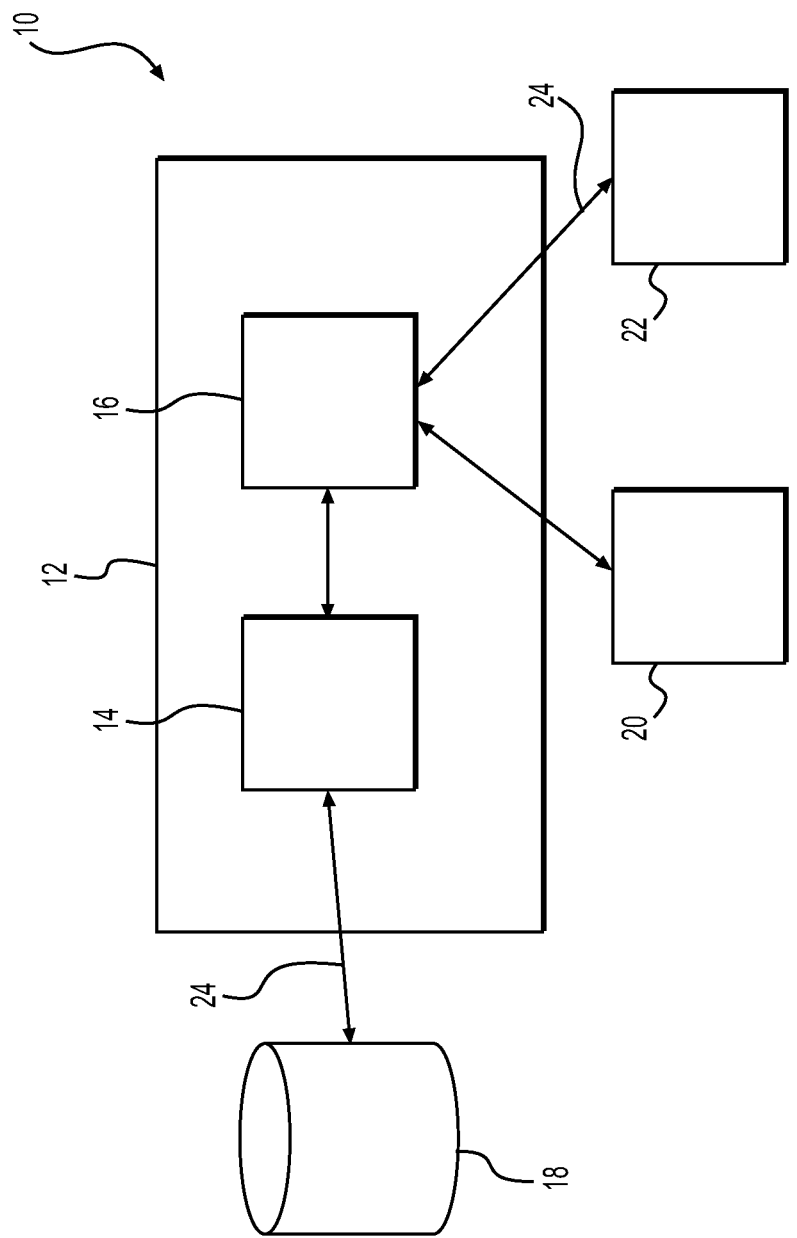
FIG. 1 is a graphical overview of one embodiment of a distributed architecture with which the bulkhead IO node of the present invention is contemplated to cooperate.

The present invention will now be described in connection with one or more embodiments. The discussion of any one embodiment is not intended to be restrictive or limiting of the present invention. To the contrary, the embodiments described are intended to be illustrative of the broad scope of the present invention.

Among other aspects, the present invention addresses controls for parameters on board an aircraft including environmental functions and functions related to passenger comfort. As noted above, environmental functions include, but are not limited to, things such as cabin temperature, the intensity of the cabin lighting, and the degree to which the window shades are open, among other variables. Functions related to passenger comfort include those related to actuation of a personal reading light, control over the air flow through an overhead vent, positioning of the passenger seat (i.e., upright or reclined), and a remote call for a flight attendant (i.e., a flight attendant call button). Other functions that are associated with passenger comfort include, but are not limited to control over media type (i.e., audio and/or video), content, and volume. With respect to content, selectivity may be provided so that a passenger may select a genre of music (i.e., jazz music or pop music) or a genre of movies (i.e., comedy or drama), among other variations. Individuals may control the volume of the media that has been selected.

As should be apparent, and as will be made more apparent in the discussion that follows, the labels "environment" and "passenger comfort" when applied to specific functions that are controllable in an aircraft are merely provided to assist with an understanding of the present invention. Use of either of the labels is not intended to be limiting, as the labels are not considered to be mutually exclusive of one another or of other functions that are not highlighted herein. For example, control over the degree to which the window shades are opened qualifies as control over an environmental function and also over aspects of passenger comfort. The lights in the aircraft belong to the same, crossover category.

With respect to the present invention, the terms "front" (or "fore"), "rear" (or "aft"), left (or "port"), and right (or "starboard") are used in the conventional fashion when referring to an aircraft. These conventions refer to the front, rear, left, and right sides of an aircraft as determined by its normal, forward direction of travel.

In addition, reference is made to members of the flight crew on board the aircraft. The term "flight crew" is intended to be generic to any member of the flight crew, including the pilot, co-pilot, and/or flight attendants. In other words, the term "flight crew" is intended to refer to persons other than passengers on board the aircraft.

The term "bulkhead" is used in the discussion of the present invention. A bulkhead is wall that is disposed within the aircraft. A bulkhead may or may not be a structural component of the aircraft.

It is contemplated that the bulkhead IO node (or bulkhead GUI) of the present invention may be provided on a corporate or private aircraft. In other words, it is contemplated that the present invention may be employed in an aircraft that typically has limited seating by comparison with a commercial, passenger aircraft. While corporate, business, or personal aircraft encompass the primary focus of the bulkhead IO node of the present invention, the present invention is not limited just to such aircraft. To the contrary, the present invention may be employed in any aircraft, including commercial passenger aircraft, without departing from the scope of the present invention.

In addition, while the bulkhead IO node of the present invention is contemplated to be employed on an aircraft, it is noted that the present invention may be employed in any other suitable environment. For example, the present invention may be practiced on a passenger car of a train, on board a ship, or any other suitable environment that should be apparent to those skilled in the art.

It is contemplated that the bulkhead IO node of the present invention will be used in conjunction with a distributed architecture 10, one embodiment of which is illustrated in FIG. 1. The distributed architecture includes a central processing unit 12 ("CPU") that includes a processor 14 and a controller 16. The CPU 12 may be a computer, as should be apparent to those skilled in the art. However, the term CPU 12 is not intended to be limited only to a computer or any part thereof. To the contrary, the term CPU 12 is intended to encompass any type of computing device that may operate to provide the functionality described herein.

The term "processor" is intended to broadly encompass any device capable of executing machine-readable instructions. In other words, the term "processor 14" is intended to refer to any device or component that processes instructions and data. As an example, semiconductor chips within a computer are considered to fall within the definition of the term "processor 14."

While it is contemplated that the processor 14 will be a single component of the distributed architecture 10, the distributed architecture 10 is not intended to be limited solely to such a construction. The processor 14 may include multiple devices that are separate from one another, but cooperate together to process data and execute instructions. For example, the processor 14 may include a semiconductor processing chip and/or any other peripheral devices that support the operation of the semiconductor processing chip. Alternatively, the processor 14 may encompass processing chips that are located in separate systems, but which are operatively connected to provide the desired functionality.

As also illustrated in FIG. 1, the CPU 12 includes a controller 16. In one embodiment, it is contemplated that the controller 16 may be a hardware component that is separate from the processor 14. In a second contemplated embodiment, the controller 16 may be embodied in software (i.e., operating software) that runs on the central processing unit 12. In other words, in this second embodiment, the processor 14 may be the device on which the controller 16 is executed. In a third contemplated embodiment, the controller 16 may be a combination of hardware and software. Regardless of whether the controller 16 is hardware, software, or a combination of the two, it is contemplated that the controller 16 will facilitate communication between the processor 14 and any input/output ("IO") and/or peripheral devices connected thereto. The peripheral devices include the bulkhead IO node of the present invention.

While the distributed architecture 10 is described in terms of a CPU 12, a processor 14, and a controller 16 (among other components), it is noted that this configuration is not intended to be illustrative of the breadth of the present invention. The configuration is not intended to exclude any possible server/client configurations. For example, the CPU 12 may be a server on which a client is resident. The controller 16 may be the client. In another configuration, the CPU 12 may be a server that provides access to an independent client. In still another configuration, the CPU 12 may be a router.

As should be apparent, there are many appellations that may be applied to the components comprising the distributed architecture 10. Those variations and equivalents are intended to be encompassed by the scope of the present invention. As illustrated in FIG. 1, the processor 14 may connect to one or more databases 18. The database 18 may be a memory storage device, an IO device such as an MP3 player, a compact disc ("CD") player, a digital video disk ("DVD") player, or any other suitable storage and playback device. To emphasize the breadth of what is meant by the term, the database 18 may include, but is not limited to, any suitable memory on which the CPU 12 relies for its operation. The term database 18 should not be understood to be limited solely to memory devices.

It is noted that the distributed architecture 10 contemplated for use with the bulkhead IO node of the present invention also may be connected to other systems and processors on board the aircraft. For example, the distributed architecture 10 may receive input from a flight computer on board the aircraft. These other input devices are not illustrated for simplicity. It is noted, however, that other inputs may be provided to the distributed architecture 10, as should be apparent to those skilled in the art.

The distributed architecture 10 is intended to be specific to the passengers and flight crew on an aircraft. As a result, the CPU 12 is contemplated to connect to at least two IO nodes: (1) a passenger IO node 20 and (2) a crew IO node 22. The passenger IO node 20 receives input and provides output to the passenger. The crew IO node 22 receives input and provides output to members of the flight crew. Both the passenger IO node 20 and the crew IO node 22 connect to the controller 16, through which selected inputs and outputs are directed.

The passenger IO node 20 is contemplated to encompass any suitable input/output device that may be available to a passenger. Similarly, the crew IO node 22 is intended to encompass any suitable input/output device that may be available to a member of the flight crew. In other words, while the present invention will be described in connection with specific devices, the present invention is not intended to be limited thereby. Other devices may be provide or substituted for the devices described herein without departing from the scope of the present invention.

In addition, as will be made more apparent in the discussion that follows, the passenger IO node 20 and the crew IO node 22 are contemplated to provide overlapping functionality. Therefore, the discussion of a particular functionality with respect to one IO node 20, 22 does not preclude the same functionality from being provided via the other of the IO nodes 20, 22.

As illustrated in FIG. 1, the various components of the distributed architecture 10 connect to one another via communication lines 24. The communication lines 24 may be wired or wireless communication lines, as should be apparent to those skilled in the art. Wired communication lines encompass, but are not limited to, wired connections and docking stations (for one or more of the IO nodes). Wireless communication lines may be provided via any suitable data format including, but not limited to, a Bluetooth™ connection (where appropriate).

Additionally, the communication lines are illustrated as two-way communication channels. While depicted as two-way communication channels, it is noted that one-way communication channels may be employed without departing from the scope of the present invention. In addition, it is also contemplated that the communication channels 24 may encompass one or more busses that channel multiple channels of communication along a single communication line 24.

Figure 2:
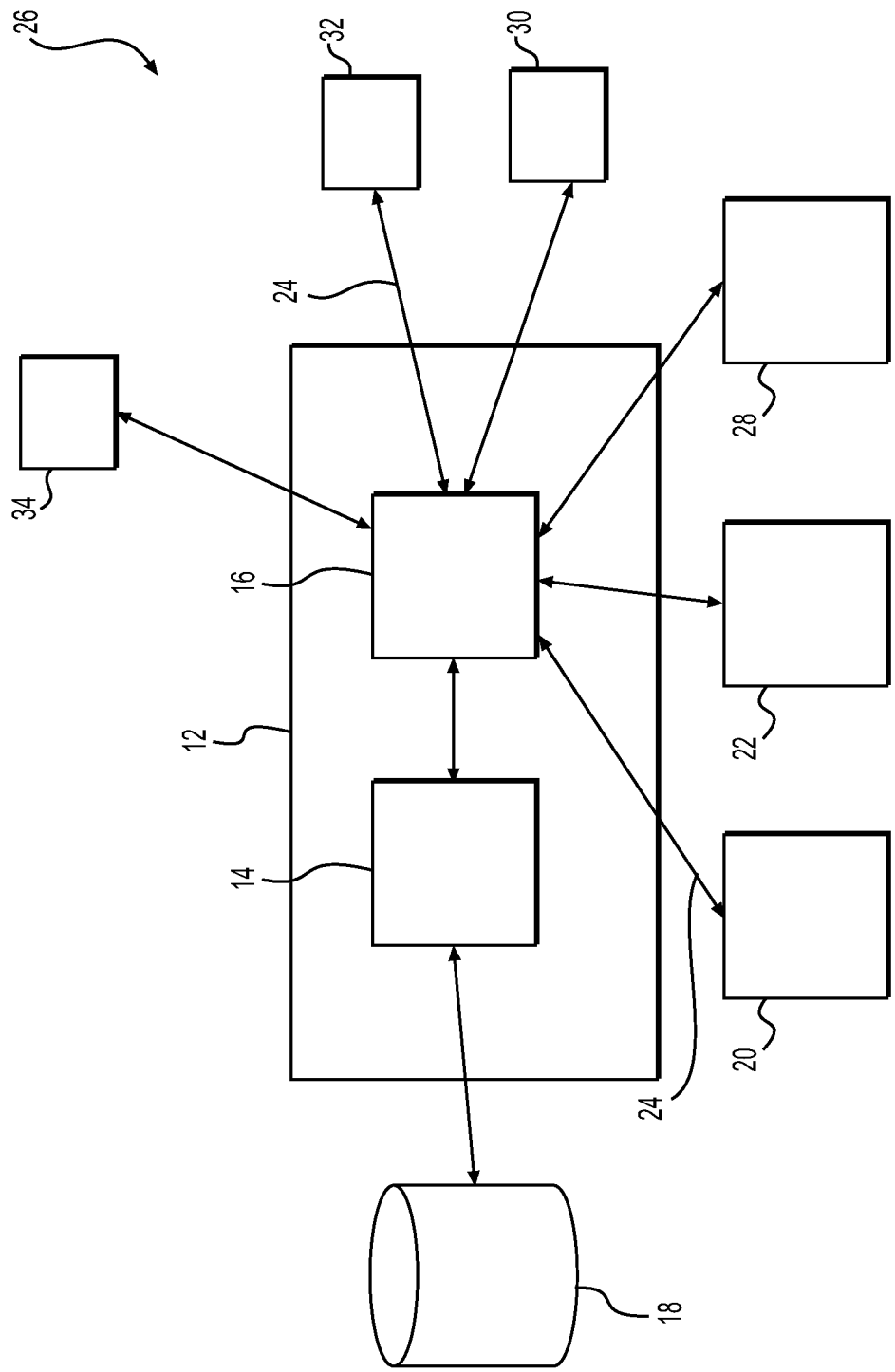
FIG. 2 is a graphical overview of a second embodiment of a distributed architecture with which the bulkhead IO node of the present invention is contemplated to cooperate.

FIG. 2 illustrates a second embodiment of a distributed architecture 26 contemplated for use with the bulkhead IO node of the present invention. As will be made apparent from the discussion that follows, the second embodiment of the distributed architecture 26 may be considered as a variation of the first embodiment.

The distributed architecture 26 is directed to a location-oriented approach rather than a person-oriented approach, as detailed in connection with the distributed architecture 10. The person-oriented approach that is employed for the distributed architecture 10 encompasses an architecture where an IO node is associated with an individual, such as a passenger or a member of the flight crew. The location-oriented approach for the distributed architecture 26 encompasses an architecture that relies, at least in part, on IO nodes that are placed at specific locations with the aircraft.

As will be made apparent in discussion that follows, there is an overlap between the first distributed architecture 10 and the second distributed architecture 26.

As illustrated in FIG. 2, the second distributed architecture 26 is similar to the first distributed architecture in that the distributed architecture 26 includes the CPU 12, the processor 14, the controller 16, and the database 18. The second distributed architecture 26 differs from the first distributed architecture 10 in that additional IO nodes are provided at specific locations within the aircraft cabin, as noted above.

As illustrated in FIG. 2, the second distributed architecture is contemplated to include the passenger IO node 20 and the crew IO node 22. In addition, the second distributed architecture 26 includes a bulkhead IO node 28, a side ledge IO node 30, a table IO node 32, and a window IO node 34. Details of the bulkhead IO node 28, the side ledge IO node 30, the table IO node 32, and the window IO node 34 are provided below.

As suggested by the nomenclature employed, the IO nodes 28, 30, 32, 34 are provided at specific locations in the aircraft. The person-specific IO nodes 20, 22 are contemplated to be portable devices that are associated with individuals and, as such, are not associated with any fixed structure within the aircraft.

As illustrated in FIGS. 1 and 2, the IO nodes 20, 22, 28, 30, 32, 34 connect to the controller 16. The controller is contemplated to incorporate a hierarchical command structure that prioritizes input(s) from the different IO nodes 20, 22, 28, 30, 32, 34. For example, the controller 16 may include a hierarchical command structure where input(s) provided by a crew member override (or nullify) input(s) provided by a passenger. In another contemplated scenario, input(s) provided at one of the IO nodes 20, 22, 28, 30, 32, 34 may be given priority over any other input(s). For example, a crew member may have closed the window shades in the aircraft so that the passengers may enjoy in-flight entertainment. A passenger may wish to open his or her window shade via the window IO node 34. So that the passenger may do this, input(s) from the window IO node 34 may be placed at the top of the hierarchical command tree. Still further, the owner or operator of the aircraft may set the hierarchical command structure for the individual aircraft or a fleet of aircraft, as required or as desired.

It is noted that the window IO node 34 and the table IO node 32 are but two examples of nodes where limited space is available for control inputs and/or outputs. The present invention should not be understood to be limited to the nodes 32, 34 that are shown and described herein.

Figure 3:
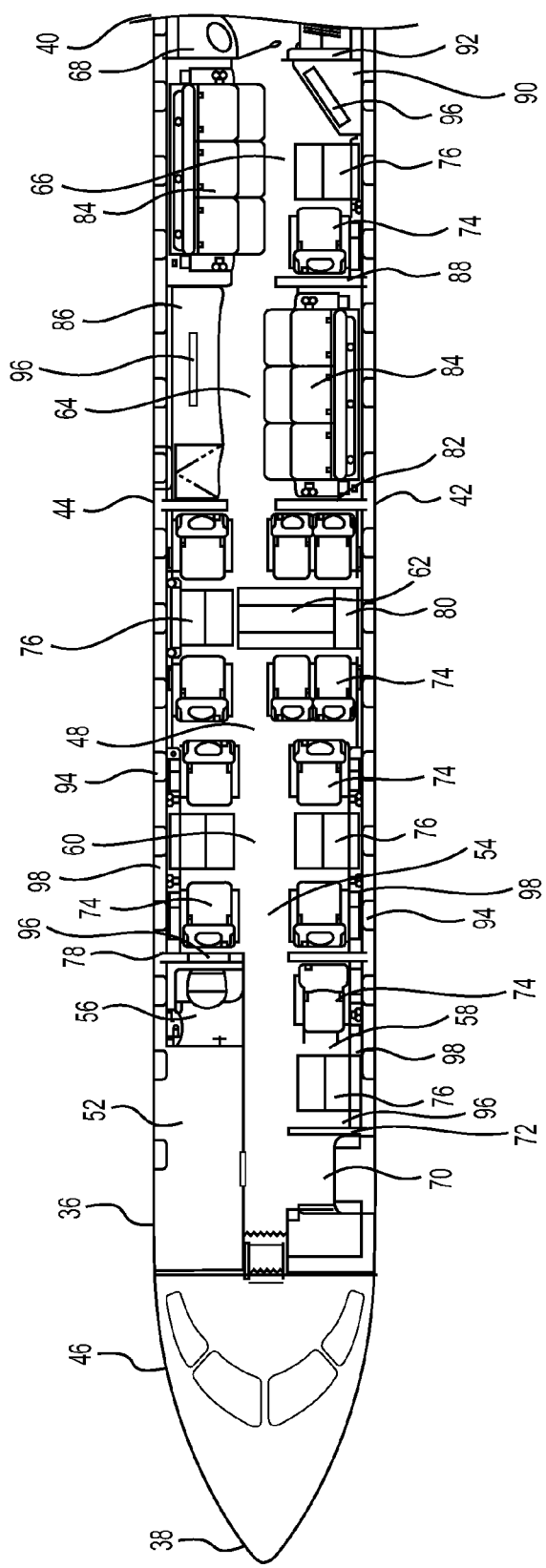
FIG. 3 is a graphical, top view of a portion of an aircraft, depicting one possible configuration for an aircraft cabin that employs the bulkhead IO node of the present invention.

To facilitate the discussion of the distributed architectures 10, 26, a top view of an aircraft 36 is illustrated in FIG. 3. The aircraft 36 that is depicted is merely exemplary of the infinite possible configurations that are possible and should not be understood to be limiting of the configurations with which the bulkhead IO node 28 of the present invention is contemplated to operate.

As illustrated in FIG. 3, the aircraft 36 has a front end 38, a rear end 40, a left side 42, and a right side 44. The fuselage 46 of the aircraft 36 defines a cabin 48 therein. The layout of the cabin 48 illustrated in FIG. 3 may be provided for a corporate, business, or personal aircraft, such as a private jet.

The cabin 48 includes a cockpit 50, a galley 52, and a passenger area 54. The cabin 48 also includes a forward lavatory 56, a first passenger seating area 58, a second passenger seating area 60, a third passenger seating area 62, a first bedroom 64, a second bedroom 66, and an aft lavatory 68.

The first passenger seating area 58 is positioned adjacent to the galley 52 and the forward lavatory 56. The first passenger seating area 58 is immediately aft of the door 70 that provides ingress into and egress out of the aircraft 36. A first bulkhead 72 separates the area adjacent to the door 70 from the first passenger seating area 58.

The first passenger seating area 58 is defined by one passenger seat 74 and a stowable table 76. The passenger seat 74 is contemplated to be a reclining seat. However, the passenger seat 74 need not recline. The stowable table 76 is contemplated to be stowable in a side compartment adjacent to the passenger seat 74. As required by applicable aviation laws, the table 76 must be stowed for taxi, take-off, and landing.

It is noted that the first passenger seating area 58 may be reserved for one or more crew members and, therefore, be understood to be a crew seating area 58. Since the type of individual that uses the seating area 58 is not critical to operation of the present invention, the seating area 58 will be referred to herein as the first passenger seating area 58.

It is also noted that, while other seating areas are indicated as being for passengers, crew members may use these areas together with the passengers.

A second bulkhead 78 separates the first passenger seating area 58 and forward lavatory 56 from the second passenger seating area 60.

The second passenger seating area 60 includes four passenger seats 74 that are positioned on opposite sides of a central aisle. Two seats 74 face one another across a table 76 on the right side 44 of the aircraft 36. Similarly, two seats 74 face one another across a stowable table 76 on the left side 42 of the aircraft.

The third passenger seating area 62 is defined by six passenger seats 74, a stowable table 76, and a stowable conference table 80. Two seats 74 face one another across the stowable table 76 on the right side 44 of the aircraft 36. Four seats 74 face one another (in two pairs) across a stowable conference table 78. As illustrated, when the tables 76, 80 are deployed, they are contemplated to form a single conference table that extends across the width of the cabin 48.

As is apparent from FIG. 3, the second seating area 60 and the third seating area 62 are not separated from one another by any bulkhead or other barrier. Instead, these passenger areas 58, 60 are contemplated to form a continuous passenger area within the cabin 48.

The first bedroom 64 is separated from the third passenger seating area 62 by a third bulkhead 82. The first bedroom 64 includes a divan 84 on the left side 42 of the aircraft 36 and a cabinet 86, such as a media cabinet, on the right side 44 of the cabin 48. It is contemplated that the divan 84 will function both as a couch (or a sofa) and a bed, depending upon its use or configuration.

The second bedroom 66 is separated from the first bedroom 64 by a fourth bulkhead 88. The second bedroom 66 includes a divan 84 on the right side 44 of the aircraft 36. A seat 74 and stowable table 76 are provided on the left side 42 of aircraft 36. Also on the left side 42 is a cabinet 90, which may be provided with a media center, including a monitor or a television.

A fifth bulkhead 92 separates the second bedroom 66 from the rear lavatory 68.

It is noted that the fuselage 46 includes a plurality of windows 94.

In addition, at least four monitors 96 (i.e., video output screens) are provided in the aircraft 36 at various locations. The monitors 96 are contemplated to be positioned to provide video information and entertainment to the passengers in the aircraft 36. It is contemplated that entertainment also may be provided to the passengers via entertainment devices that are associated with the passenger seats 74.

As illustrated, the cabin 48 also includes several side ledges 98 that extend along the length of selected ones of the passenger seating areas 58, 60, 62. Where they are provided, the side ledges 98 are disposed between the passenger seat 74 and the wall of the fuselage 46. As is apparent from FIG. 3, the side ledges 98 are provided in the first passenger seating area 58 and the second passenger seating area 60. While side ledges 98 are not illustrated for the third passenger seating area 62, side ledges 98 may be provided in this seating area without departing from the scope of the present invention.

It is noted that the term "side ledge" is intended to encompass other furniture within the cabin 48 of the aircraft 36 in addition to the typical side ledge 98 that is identified in FIG. 3. Specifically, a cabinet or side ledge 98 may be provided adjacent to the divan 84 in the aircraft 36. While such a side ledge 98 would extend transversely to the travel direction of the aircraft 36, the side ledge 98 may be provided with control functionality. In addition, if the aircraft 36 were to include a bed with night stands, the night stands would be considered as side ledges 98 for purposes of the present invention.

As should be apparent to those skilled in the art, the configuration for the cabin 48 of the aircraft 36 that is provided in FIG. 3 is merely exemplary of the many possible configurations that may be employed in the cabin 48 of the aircraft 36. In other words, the present invention should not be understood to be limited to use on aircraft 36 with the configuration depicted in FIG. 3.

With renewed reference to the distributed architectures 10, 26, either architecture 10, 26 (or any variant thereof) may be employed onboard the aircraft 36. For purposes of the discussion herein, the aircraft 36 includes the second distributed architecture 26.

In this architecture, the passenger IO node 20 is contemplated to be a mobile electronic device, as discussed above. Mobile electronic devices include, but are not limited to, portable computers, tablets, and smartphones. As will be made apparent from the discussion that follows, it is contemplated that the passenger IO node 20 will be capable of receiving and storing a software program, such as an "app." The app may be specific to a particular aircraft or airline, as required or desired. The app is contemplated to provide the software needed for proper interface with the controller 16 for operation of the distributed architecture 26. In other words, the software resident on the passenger IO node 20 is contemplated to be configured to provide input to the CPU 12 and to receive output from the CPU 12.

The crew IO node 22 also is contemplated to be a mobile device, such as a portable computer, tablet, or smartphone. As with the passenger IO node 20, the crew IO node 22 is contemplated to be provided with a suitable app (or resident software) for interface with the CPU 12.

Where the mobile IO nodes 20, 22 are tablets (or other suitable electronic devices), it is contemplated that the tablets 20, 22 will be provided with the delivery to the customer of the aircraft 36. In this embodiment, when a passenger boards the aircraft 36, the passenger will be assigned one of the mobile devices for use during the flight.

Alternatively, it is contemplated that a passenger may bring his or her own mobile device on board the aircraft 36. If so, the passenger (and/or crew member) may be prompted to download suitable software (i.e., the app) for interface with the controller 16 prior to boarding the aircraft. In a further contemplated embodiment, the passenger (and/or crew member) may be prompted to download suitable software after boarding the aircraft, for example.

Similarly, while it is contemplated that members of the flight crew will be provided with suitable devices for the crew IO node(s), flight crew members also may supply their own personal mobile devices. If so, the member of the flight crew also will be required to download and install suitable software prior to boarding the aircraft.

As also discussed above, the aircraft 36 may include additional IO nodes.

One of the additional IO nodes is the bulkhead IO node 28, which is the focus of the present invention. The bulkhead IO node 28 is contemplated to be provided in selected bulkheads 72, 78, 82, 88, 92. As will be made apparent from the discussion that follows, the bulkhead IO node 28 provides access to several of the functions that are controllable within the cabin 48.

Before providing additional details regarding the bulkhead IO node 28, it is noted that the bulkhead IO node 28 need not cooperate with the distributed architectures 10, 26. It is contemplated, as an aspect of the present invention, that the bulkhead IO node 28 may be provided as a separate control within the cabin 48 of the aircraft 36. In other words, the bulkhead IO node 28 may be an additional, independent control device that is incorporated into the cabin 48 of the aircraft 36 and that operates independently of any distributed architecture 10, 26.

Figure 4:
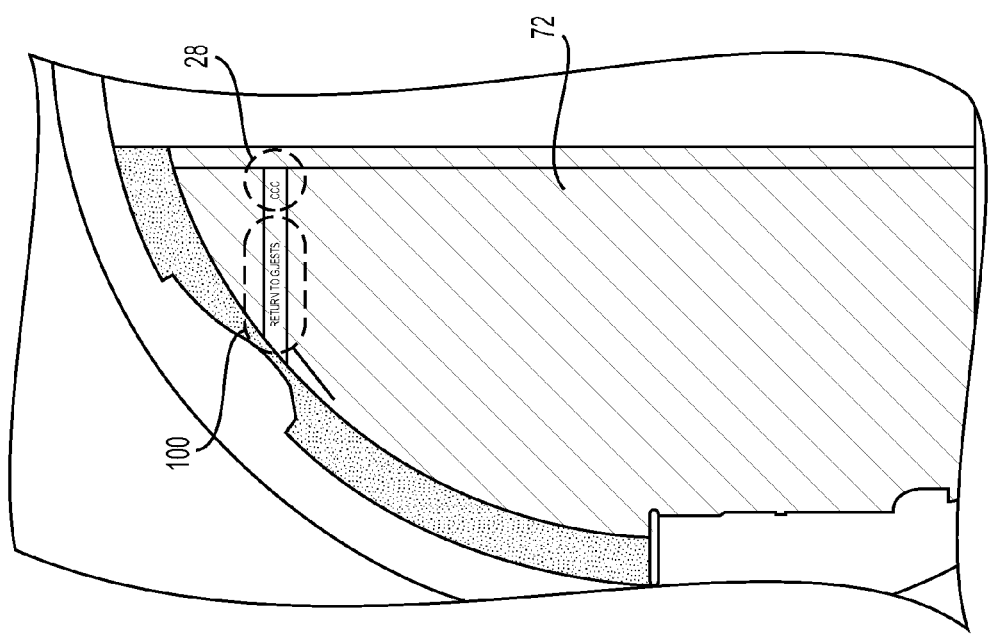
FIG. 4 is a front, graphical view of one half of a bulkhead within the aircraft cabin incorporating a bulkhead IO node of the present invention.

FIG. 4 is a graphical illustration of one contemplated design for the first bulkhead 72. The same design is anticipated to be incorporated into the remaining bulkheads, as required or as desired.

The first bulkhead 72 is one half of a wall in the aircraft 36. A notice display area 100 is provided in the bulkhead 72 to convey specific information, such as "fasten seat belts." The bulkhead IO node 28 is contemplated to be positioned adjacent to the notice display area 100. Preferably, the bulkhead IO node 28 is positioned closer to the aisle than the notice display area 100. When positioned in this location, a person is unlikely to obstruct the displayed notice when manipulating the controls provided via the bulkhead IO node 28.

The bulkhead IO node 28 is contemplated to be a touch-sensitive display panel, similar to one of a tablet or smartphone device. Specifically, the bulkhead IO node 28 is contemplated to be an interactive device. Being an interactive device, it is contemplated that the bulkhead IO node 28 will change its display information depending upon the icon(s) selected by the passenger or flight crew. In addition, the bulkhead IO node 28 is contemplated to be positioned at a suitable height, so that the passengers (and/or flight crew members) are able to read the information displayed thereon.

It is noted that the term "user" is employed to refer to passengers and flight crew members, since both categories of persons are contemplated to be users of the present invention. As such, where the terms "passenger" or "flight crew member" are used, the term is not intended to exclude use by any other user, as required or as desired.

Figure 5:
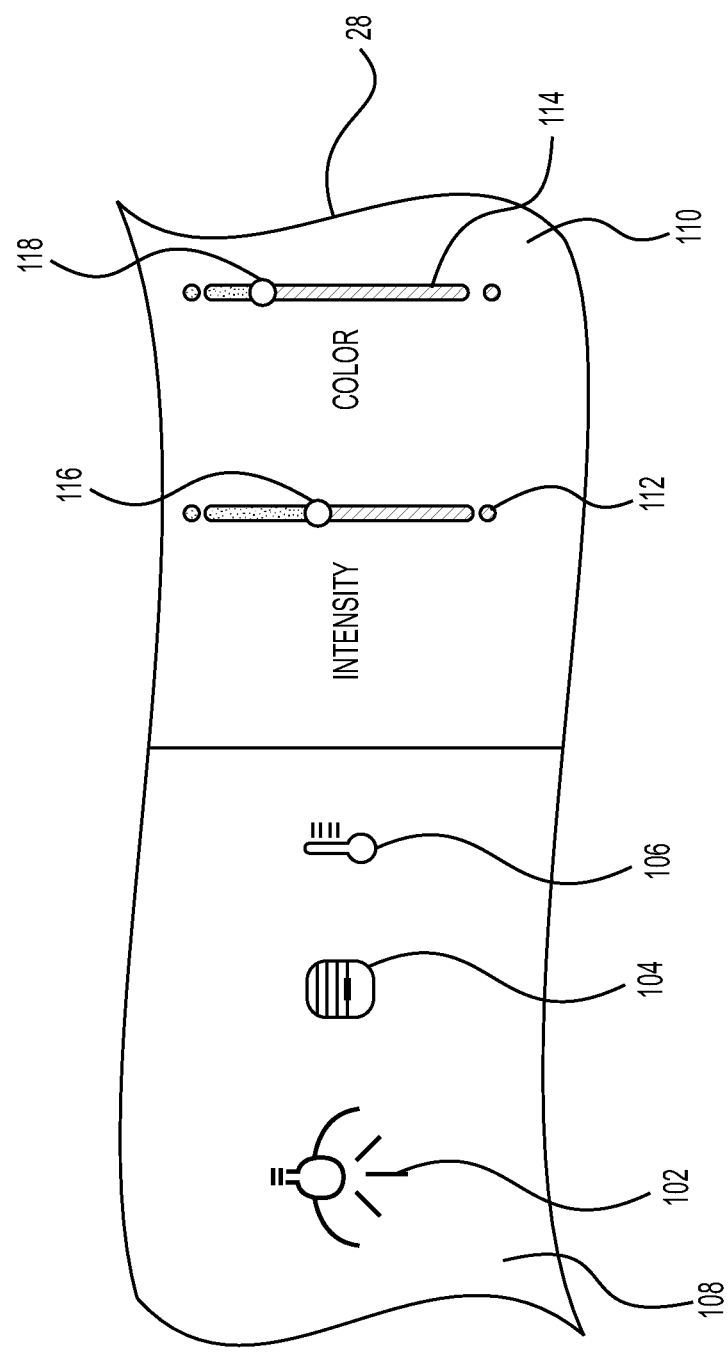
FIG. 5 is an enlarged, elevational view of the bulkhead IO node that is depicted in FIG. 4, illustrating a first mode of operation thereof.

An enlarged detail of one contemplated embodiment of the bulkhead IO node 28 is provided in FIG. 5. In this illustration, the bulkhead IO node 28 is installed in the first bulkhead 72.

The bulkhead IO node 28 is contemplated to provide input for control of the overhead lights, the degree to which the window shades are open, and the temperature within the area of the cabin 48 immediately adjacent thereto. As a result, the bulkhead IO node 28 includes three icons: (1) a light panel icon 102, (2) a window shade icon 104, and (3) a thermostat icon 106.

As depicted, it is contemplated that the bulkhead IO node may include a first display area 108 and a second display area 110. The three icons 102, 104, 106 are provided in the first area 108. The second display area 110 is reserved to display control bars associated with the three functions that are controlled by the bulkhead IO node 28.

FIG. 5 illustrates the visual display contemplated to be output after a person touches the light panel icon 102, which is contemplated to be highlighted after being selected. When a user selects the light panel icon 102, the light panel icon 102 is highlighted and two control bars appear in the second display area 108. The first control bar is the light intensity control bar 112. The second control bar is the light color control bar 114.

The light intensity control bar 112 includes a slider 116 that may be moved between a minimum light intensity and a maximum light intensity. It is contemplated that the minimum light intensity will be 0% illumination and the maximum light intensity will be 100% illumination. As should be apparent, the minimum and maximum intensities need not be 0% and 100%, respectively, to practice the present invention. Alternatively, the light intensity may be displayed in any other suitable format, such as "watts" or "lumens."

The light color control bar 114 also includes a slider 118 that may be moved between two different color selections for the overhead cabin lights. One end of the scale may be a color of the light commonly referred to as "cool" light. The other end may be a color referred to as "warm" light. Cool light typically includes a greater intensity of blue hues, while warm light typically includes more yellow light. With respect to the warmness (i.e., the yellow or amber content) or coolness (i.e., the blue content) of the light, it is contemplated that the user will adjust the color of the light between two standard colors for the light. As should be apparent, the colors may be set according to standards for lighting or they may be selected by the aircraft owner or user, as appropriate.

In a further mode of operation, it is contemplated that control may be provided over the red, green, and blue ("RGB") color components of the light. This is particularly possible in instances where the lighting is provided by light emitting diodes ("LEDs"). If so, it is contemplated that control bars and sliders may be provided for each of the RGB values and that the user may control each of the RGB values (or other values) independently from one another. The scale of the RGB values may be between 0% and 100% saturation, as should be apparent to those skilled in the art.

In one contemplated mode of operation, the sliders 116, 118 may respond to a sliding motion of the user's finger across the touch-sensitive surface of the bulkhead IO node 28. In another contemplated embodiment, the user may tap on the surface of the bulkhead IO node 28 at a selected point between the end points of the control bars 112, 114 to alter the light parameters associated therewith.

Figure 6:
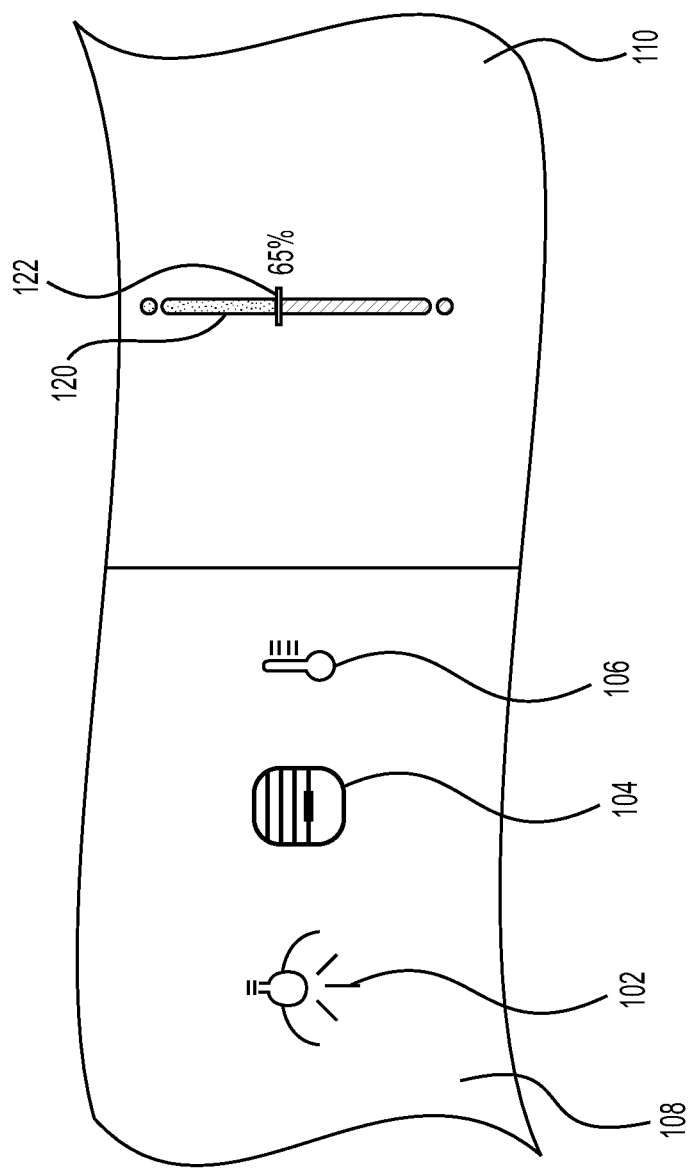
FIG. 6 is an enlarged, elevational view of the bulkhead IO node that is depicted in FIG. 4, showing a second mode of operation thereof.

FIG. 6 illustrates the visual display contemplated to be output after a person touches the window shade icon 104, which is contemplated to be highlighted after being selected. When a user selects the window shade icon 104, the window shade icon 104 is highlighted and a window shade control bar 120 appears. The window shade bar 120 permits a user to touch the surface of the bulkhead IO node 28 and control the degree to which the window shades in the cabin 48 are opened. Specifically, by moving the slider 122 between a minimum of 0% open and 100% open, the user may control the degree of openness of one or more of the window shades in the cabin 48 of the aircraft 36.

With respect to the window shades, it is noted that the window shades may be of any particular type without departing from the scope of the present invention. For example, the window shades may be made from a sheet of material that moves (via a motor, for example) in front of the window to block the transmission of light therethrough. Alternatively, the window shades may be made from an electrochromic material. Electrochromic materials respond to signals by altering their color and/or opacity.

Figure 7:
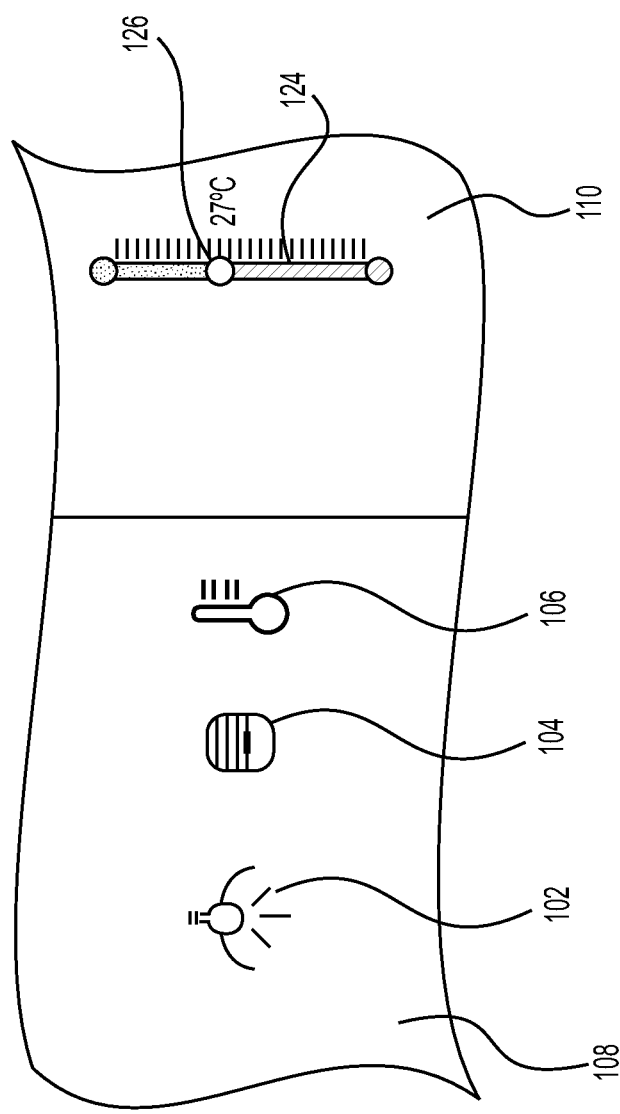
FIG. 7 is an enlarged, elevational view of the bulkhead IO node that is depicted in FIG. 4, showing a third mode of operation thereof.

FIG. 7 illustrates the visual display contemplated to be output after a person touches the thermostat icon 106, which is contemplated to be highlighted after being selected. When a user selects the thermostat icon 106, the thermostat icon 106 is highlighted and a temperature control bar 124 appears. The temperature bar 124 permits a user to touch the surface of the bulkhead IO node 28 and control the temperature in the cabin 48 between a minimum and a maximum. Specifically, by moving the slider 126 between a minimum and a maximum, the user may control the temperature within the cabin 48 of the aircraft 36.

It is contemplated that the minimum and maximum temperatures for the thermostat icon 106 will be within 5-10° C. of a standard median temperature of 25° C. In other words, the thermostat icon 106 is contemplated to provide the ability for a user to control the temperature in the cabin 48 between 15-35° C. Of course, the temperature range may be selected based on personal preferences, etc.

Figure 8:
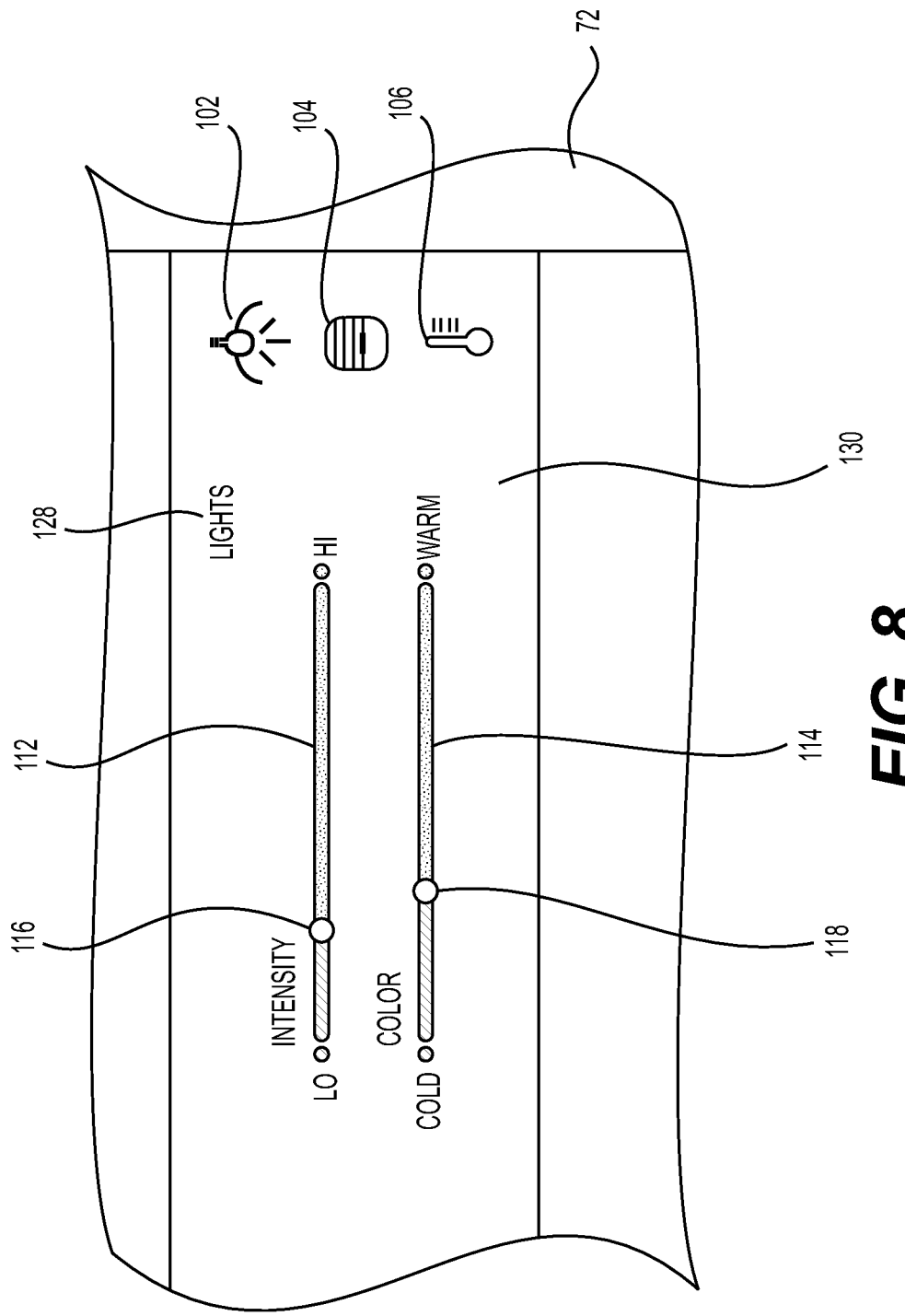
FIG. 8 is an enlarged, elevational view of a second embodiment of the bulkhead IO node of the present invention, showing a variation of the first mode of operation depicted in FIG. 4.

FIG. 8 provides a second embodiment of a display after actuation of the light panel icon 102. In this embodiment, the display includes a menu title 128 of "LIGHTS." In addition, the control bars 120, 122 are displayed in the display area 130 with a horizontal arrangement, rather than a vertical orientation as provided in FIG. 5.

Figure 9:
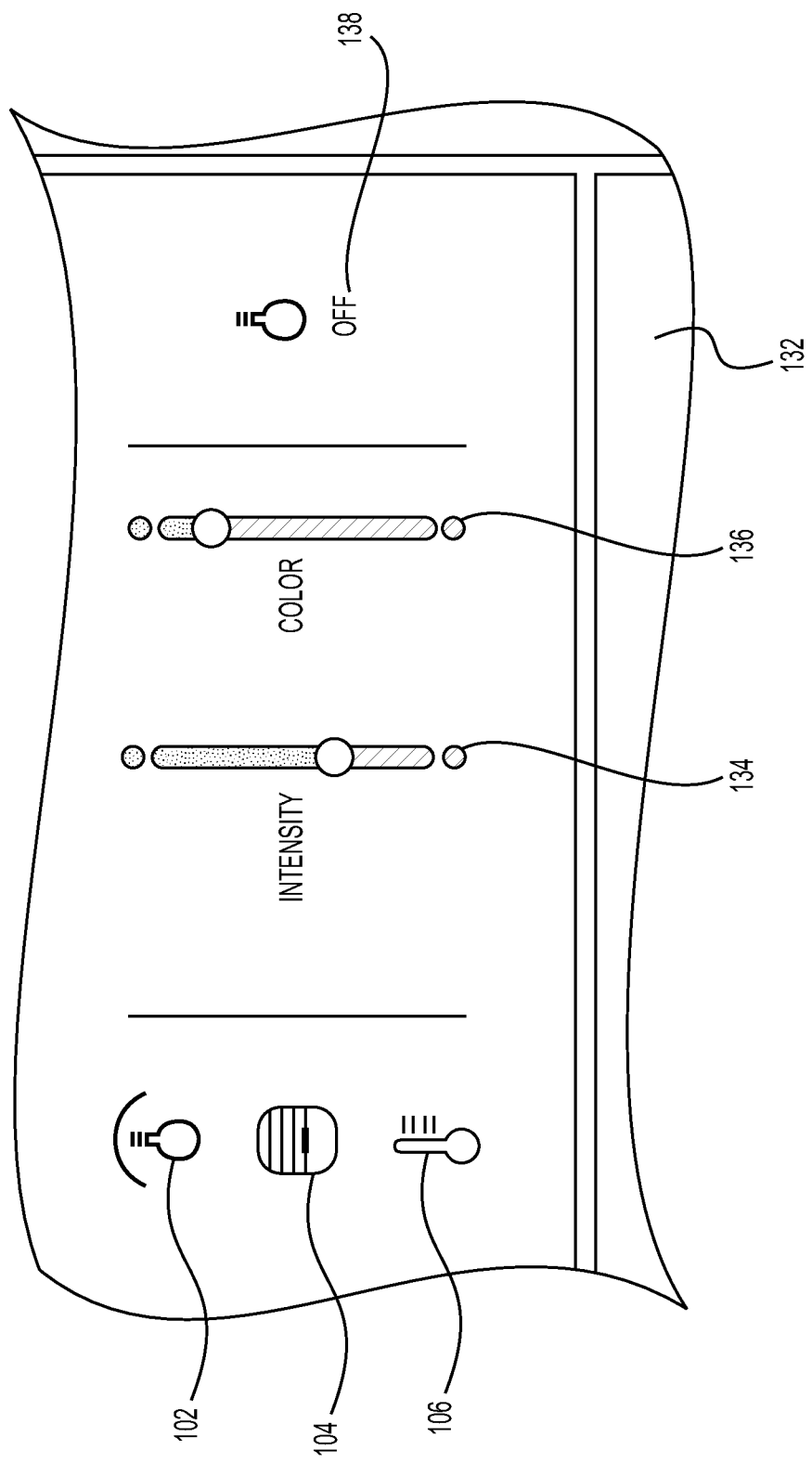
FIG. 9 is an enlarged, elevational view of a further contemplated embodiment of the bulkhead IO node of the present invention.

FIG. 9 provides a third embodiment of a display after actuation of the light panel icon 102. In this embodiment, the display area 132 shows the light panel icon 102, the window shade icon 104, and the thermostat icon 106 in a vertical arrangement. In this embodiment, the lights intensity control bar 134 and the color control bar 136 are vertically disposed. This embodiment also includes an off icon 138 to cause the display area 132 to go dark.

As should be apparent from the foregoing, the light panel icon 102, the window shade icon 104, and the thermostat icon 106 provide control over aspects of the entire cabin 48. Returning to the illustration of the aircraft 36 in FIG. 3, a bulkhead IO node 28 may be provided on each of the bulkheads 72, 78, 82, 88 to provide control in each of the seating areas 58, 60, 62 and bedrooms 64, 66 defined within the cabin 48 of the aircraft 36. As a result, environmental conditions in each of the separate areas 58-66 may be controlled by separate bulkhead IO nodes 28.

Figure 10:
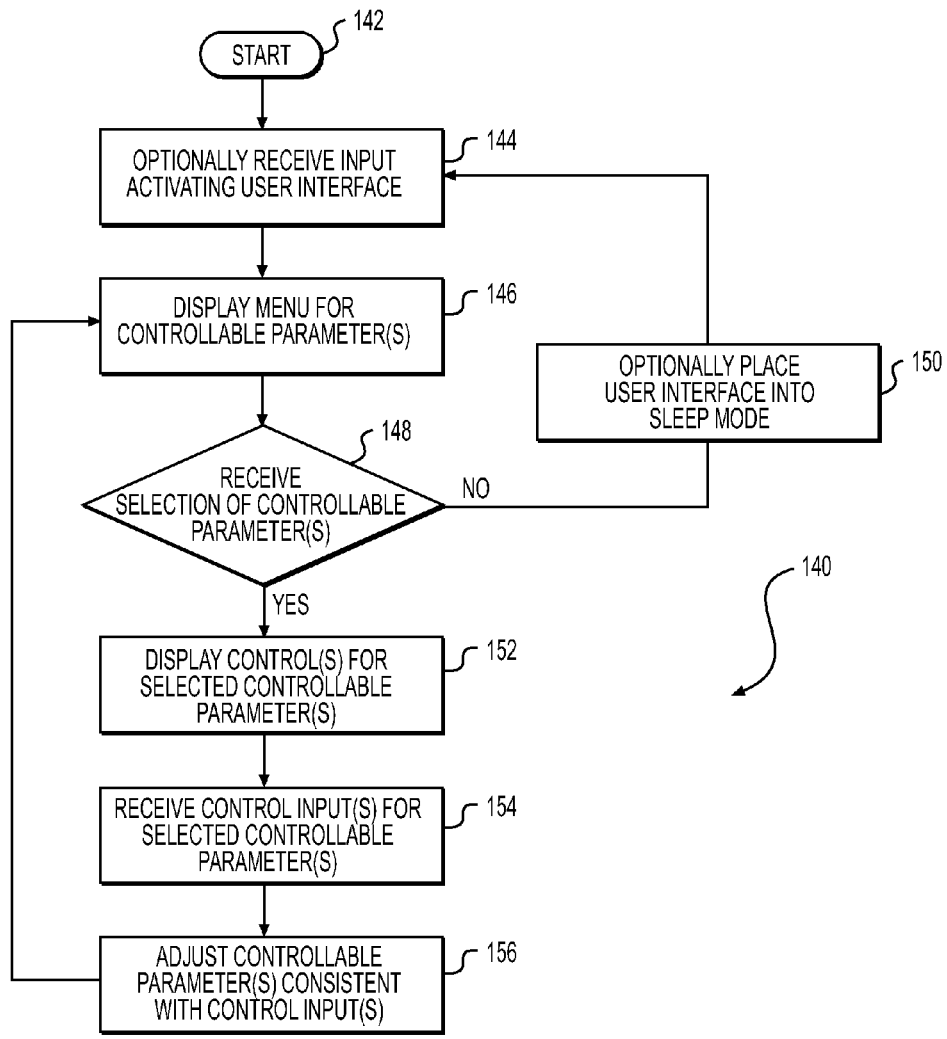
FIG. 10 is a flow chart illustrating a first method of operation of the bulkhead IO node of the present invention.

FIG. 10 is a graphical illustration of one method 140 contemplated by the present invention. The method 140 is considered to be generic to the operation of the bulkhead IO node 28 of the present invention.

The method 140 begins at step 142. The method 140 proceeds to step 144 where the method optionally receives input activating the user interface associated with the bulkhead IO node 28.

It is contemplated that the bulkhead IO node 28 might not provide any display until activated. A passenger or crew member may activate the bulkhead IO node 28 by touching the touch-sensitive surface thereof. Alternatively, a switch may be provided to turn on or turn off the bulkhead IO node 28.

Separately, it is contemplated that the bulkhead IO node 28 may operate such that the bulkhead node 28 remains in a constant on mode of operation. In this contemplated mode of operation, the bulkhead IO node 28 is contemplated to provide a display at all times during flight.

From optional step 144, the method 140 proceeds to step 146, where a menu for controllable parameters is displayed. The menu includes, but is not limited to, a display of the light panel icon 102, the window shade icon 104, and the thermostat icon 106. As discussed above, each of these icons is associated with a controllable parameter on board the aircraft 36.

The method 140 then proceeds to step 148, where a selection of one of the controllable parameters is received by the method 140. As noted above, the input may be received when a person taps on a particular icon 102, 104, 106. In an alternative contemplated operation, the user may use a swiping motion to access the menus associated with the icons 102, 104, 106. Specifically, the user may use a swiping motion, by dragging his or her finger across the surface of the bulkhead IO node 28, to navigate through the different menus associated with each of the icons 102, 104, 106.

If no input is received at step 148, the method 140 proceeds to an optional step 150 where the bulkhead IO node 28 is placed into a sleep mode. In the sleep mode, the bulkhead IO node 28 may go dark. Alternatively, it may continue to display the screen last selected by a user. In still another embodiment, the bulkhead IO node 28 may default to the main menu.

If the user selects one of the controllable parameters by selecting one of the icons 102, 104, 106, the method 140 proceeds to step 152. At step 152, the method 140 displays the controls appropriate for the selected controllable parameter. For example, if the light panel icon 102 is selected, the light intensity control bar 112 and the color control bar 114 may be displayed.

Once the control(s) are displayed, the method 140 proceeds to step 154. At step 154, the method receives control input(s) from the user to adjust one or more of the controllable parameters in the cabin 48 of the aircraft 36.

After receiving the input at step 154, the method 140 proceeds to step 156, where the selected, controllable parameters are adjusted according to the input provided by the user.

After step 156, the method 140 is contemplated to return to step 146 and display the main menu.

As noted above, it is contemplated that the bulkhead IO node 28 will operate after being awakened by a person's touch. In keeping with this mode of operation, it is contemplated that the bulkhead IO node 28 will enter into a sleep mode (or go dark) after the expiry of a predetermined time period. For example, if the bulkhead IO node 28 has not received tactile input for a period of 2 minutes, the bulkhead IO node 28 will be instructed to enter into the sleep mode where it will await the next command.

FIGS. 11-14 illustrate a second method 158 contemplated for the operation of the bulkhead IO node 28 according to the present invention.

The method 158 starts at step 160. The method 158 then proceeds to step 162 where the method optionally receives an input activating the user interface, particularly, the bulkhead IO node 28. As noted above, this step 162 is not required if the bulkhead IO node 128 operates in a constant on state.

From the optional activation step 162, the method 158 proceeds to step 164, where a display menu is provided for the parameters that are controllable by the bulkhead IO node 28. As discussed above, this includes the display of at least the light panel icon 102, the window shade icon 104, and the thermostat icon 106.

Figure 12:
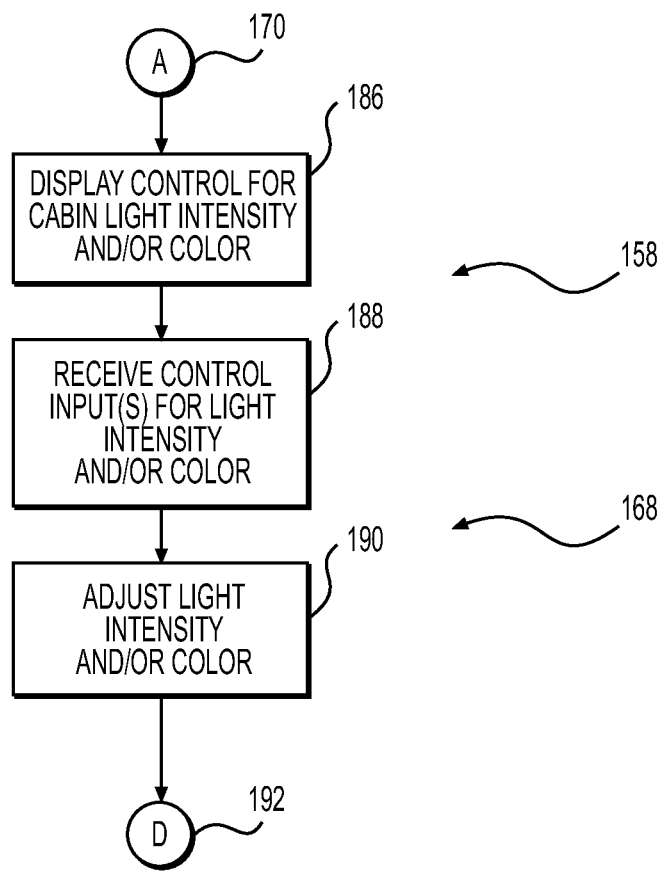

From step 164, the method 158 proceeds to step 166, where the method 158 queries if there has been receipt of the cabin light controls in response to access of the light panel icon 102. If there has been receipt of input selecting the cabin light controls, the method proceeds to the cabin lights subroutine 168 via the connector 170. The cabin lights subroutine 168 is illustrated in FIG. 12. If no input has been provided for access of the cabin light control panel, then the method proceeds to step 172.

Figure 11:
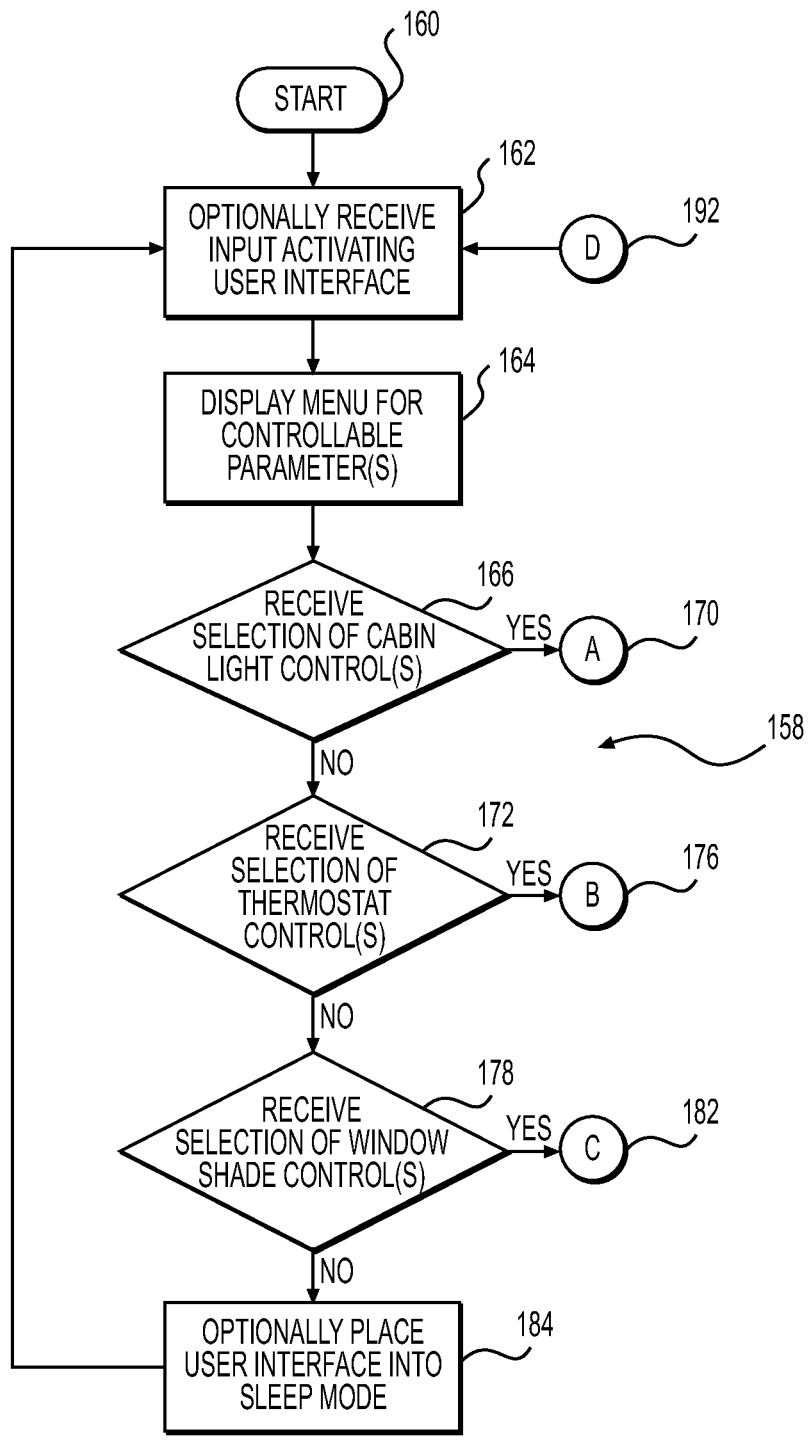
FIGS. 11-14 collectively depict various aspects of a flow chart illustrating a second method of operation of the bulkhead IO node of the present invention.
Figure 13:
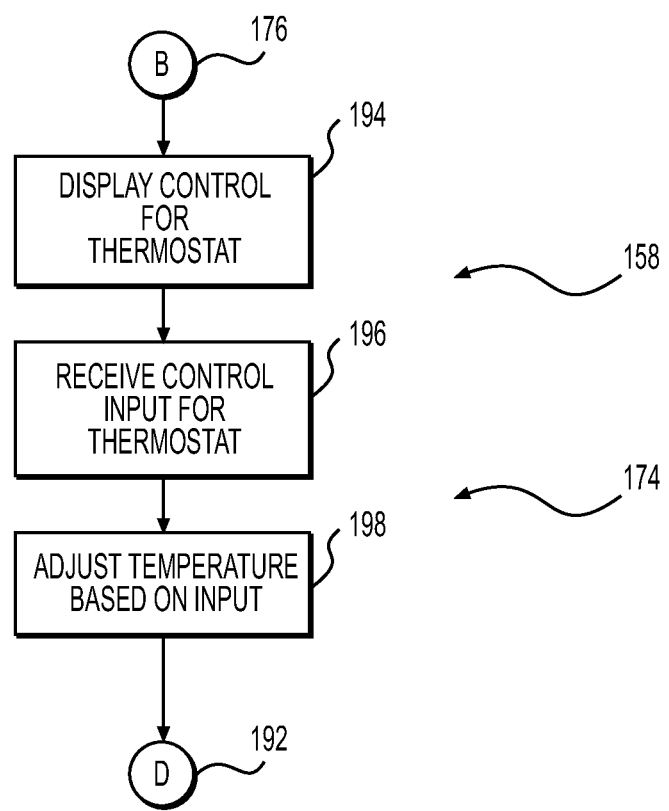

At step 172, the method 158 queries if there has been receipt of a selection of the thermostat controls, which results from selection of the thermostat icon 104, for example. If the thermostat icon 104 has been selected, the method 158 proceeds to the thermostat subroutine 174, which is illustrated in FIG. 13. A connector 176 is depicted in FIG. 11 to illustrate the connection with the subroutine 174 shown in FIG. 13.

If there has been no selection of the thermostat controls, the method 158 proceeds to step 178. At step 178, the method 158 queries if there has been receipt of the window shield controls, such as would be accessed by activating the window shade icon 106, for example. If the user did activate the window shade icon 106, the method 158 proceeds to the subroutine via the connector 182.

If there has been no selection of the window shade controls, the method 158 proceeds to step 184. At step 184, the method optionally places the user interface into a sleep mode. Next, the method 158 returns to step 162, which is the optional step of responding to an activation of the bulkhead IO node 28.

As should be apparent from the foregoing, the steps 166, 172, 178 need not proceed in the order specified. To the contrary, any order may be employed without departing from the scope of the present invention. Moreover, the steps 166, 172, 178 may proceed in parallel, if required or if desired.

As noted above, FIG. 12 illustrates the cabin light subroutine 168. The cabin light subroutine 168 begins at step 186, where the method 158 displays controls for the intensity of the slight and/or the color of the light. As noted above, the intensity of the light may be controlled by a light intensity control bar 112. As also noted above, color of the light may be controlled via a color control bar 114.

At step 188, the method 158 receives the control inputs for one or both of light intensity and color. The method 158 then proceeds to step 190, where aspects of the cabin lights are altered based on the inputted values. For example, if the user inputs a light intensity of 50% of maximum, the method 158 responds at step 190 to adjust the light intensity consistent with the inputted value.

After adjustment(s) have been made to the intensity and/or color of the cabin lights, the method 158 returns to step 162 via the connector 192. As noted above, step 162 is considered to be the initial, optional step for the method 158 of the present invention.

FIG. 13 illustrates the thermostat subroutine 174. The thermostat subroutine 174 begins at step 194, where the method 158 displays the control for the thermostat. As noted above, step 174 occurs after the user selects the thermostat icon 104 that is displayed on the bulkhead IO node 28. The display for the thermostat is anticipated to include a thermostat control bar 124, for example.

At step 196, the method receives control inputs for the thermostat. This may include receipt of manipulation by the user of the slider 126 on the thermostat control bar 124.

After control inputs are received, the method proceeds to step 198. At step 198, the method 158 adjusts the temperature in the cabin 48 (or zone) of the aircraft 36 based on the received control inputs.

After the temperature is adjusted, the method 158 returns to step 162 via the connector node 192.

Figure 14:
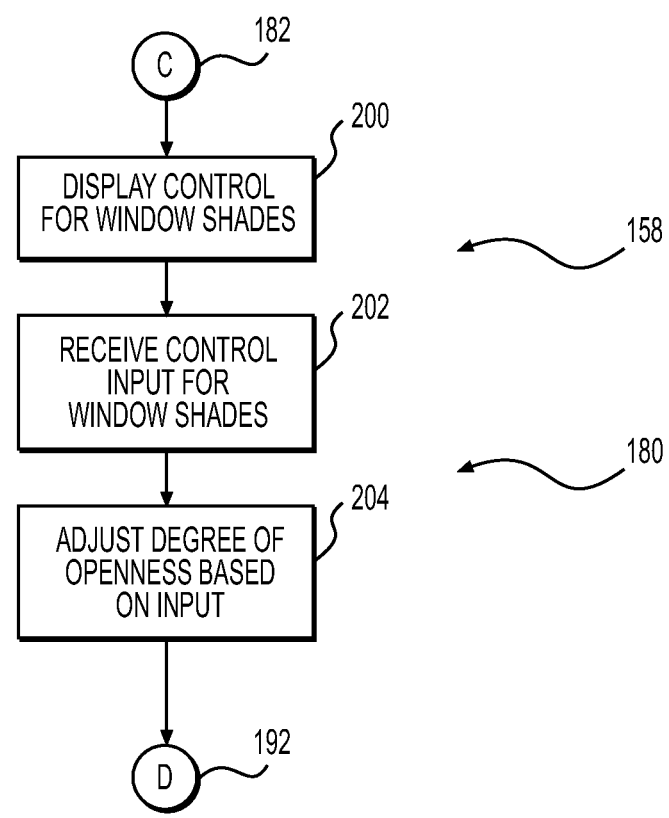

FIG. 14 illustrates the window shades subroutine 180. The window shades subroutine 180 is accessed when a user selects the window shade icon 106, for example.

The window shades subroutine 180 begins at step 200, where the method 158 displays the controls for the window shades. The control may take the form of the window shades control bar 120 with a slider 122.

At step 202, the method 158 receives input regarding the degree to which the window shades are to be opened (i.e., 35% opened).

At step 204, the method 158 adjusts the window shades based on the input provided in step 202.

After step 204, the method 158 returns to step 162 via the connector 192.

As should be apparent from the foregoing, the window shades subroutine 180 is contemplated to provide control over all of the window shades for the windows 94 in the cabin 48 of the aircraft 36. It is contemplated, however, that the user may be provided with control over the window shades in a particular region or zone of the cabin 48 of the aircraft 36. Still further, it is contemplated that the user may be provided with control over a single window shade for one of the windows 94 in the aircraft 36.

As should be apparent, the control inputs from the bulkhead IO node 28 are contemplated to be provided to the processor CPU 12 on board the aircraft 36. By receiving the control inputs from the bulkhead IO node 28, the CPU 12 may coordinate with any separate inputs that may be received from another passenger.

It is contemplated that the bulkhead IO node 28 will provide signals that are dominant to any signals that are provided via a local node at the passenger seat, for example. As a result, if the passenger selects to have the window shade open by 50%, but a flight crew member requires the shades to be closed for purposes of in-flight entertainment, it is contemplated that the flight crew member may override the command provided by the passenger from his or her seat 74, thereby forcing the window shade to close.

As should be apparent to those skilled in the art, each of the different controls may be subject to one or more hierarchies for control. The CPU 12 is contemplated to defer to the controls in a hierarchical manner. The precise structure of any such control hierarchy is not critical to the operation of the present invention.

As noted above, the present invention is not intended to be limited solely to the embodiment(s) described herein. To the contrary, those skilled in the art should appreciate that the present invention may be embodied in one or more variations and equivalents to the embodiment(s) described herein. The present invention is intended to encompass those variations and equivalents.

What is claimed is:

1. A method of operation for a system incorporating a bulkhead graphical user interface disposed in a bulkhead within a cabin of an aircraft, the bulkhead dividing the cabin lengthwise into cabin zones, wherein the system comprises a processor, a controller operatively connected to the processor, and the bulkhead graphical user interface connected to the controller, the method comprising:

displaying a menu of at least one controllable parameter on the bulkhead graphical user interface, wherein the bulkhead graphical user interface is disposed within the bulkhead adjacent to a first cabin zone;

receiving, by the controller, a selected controllable parameter from the menu of at least one controllable parameter on the bulkhead graphical user interface;

displaying at least one control for the selected controllable parameter on the bulkhead graphical user interface;

receiving, by the controller, a control input for the selected controllable parameter from the bulkhead graphical user interface;

adjusting, by the controller, the selected controllable parameter within the first cabin zone, independently from a second cabin zone, consistent with the control input, wherein the selected controllable parameter comprises at least one of cabin light intensity, cabin light color, temperature, and the degree of openness of at least one window shade;

prioritizing, by the controller, the control input received from the bulkhead graphical user interface in relation to control inputs received from another input device, thereby avoiding conflicts between the control inputs, wherein the first cabin zone extends between two bulkheads in the cabin of the aircraft.

2. The method of claim 1, further comprising:

placing the bulkhead graphical user interface into a sleep mode if the selected controllable parameter is not received.

3. The method of claim 1, wherein cabin light intensity, temperature, and degree of openness of the at least one window shade are adjustable between a predetermined minimum and a predetermined maximum.

4. The method of claim 3, wherein cabin light intensity, temperature, and degree of openness of the at least one window shade are adjustable in response to a sliding motion across a touch-sensitive surface of the bulkhead graphical user interface.

5. The method of claim 1, wherein the light color is adjustable between a predetermined warm color and a predetermined cool color.

6. The method of claim 1, wherein the displaying of the menu of the at least one controllable parameter includes displaying a cabin light icon, a thermostat icon, and a window shade icon.

7. The method of claim 1, wherein the first cabin zone comprises at least one of a crew seating area, a passenger seating area, a bedroom, and a conference room between the two bulkheads in the cabin of the aircraft.

8. A system incorporating a bulkhead graphical user interface disposed in a bulkhead within a cabin of an aircraft, the bulkhead dividing the cabin lengthwise into cabin zones, comprising:

a processor;

a controller being operatively connected to the processor, wherein the bulkhead graphical user interface is connected operatively to the processor and the bulkhead graphical user interface is disposed within the bulkhead adjacent to a first cabin zone;

a first display for displaying on the bulkhead graphical user interface a menu of at least one controllable parameter;

an input on the bulkhead graphical user interface for receiving a selected controllable parameter from the menu of the at least one controllable parameter; and a second display for displaying on the bulkhead graphical user interface at least one control for the selected controllable parameter, wherein the input receives a control input for the selected controllable parameter;

wherein, consistent with the control input, the controller adjusts the selected controllable parameter from at least one of cabin light intensity, cabin light color, temperature, and the degree of openness of at least one window shade within the first cabin zone independently from the second cabin zone, and wherein the first cabin zone extends between two bulkheads in the cabin of the aircraft, and wherein the controller prioritizes the control input received from the bulkhead graphical user interface in relation to control inputs received from another input device, thereby avoiding conflicts between the control inputs.

9. The system of claim 8, wherein the bulkhead comprises at least one interior wall within the cabin of the aircraft.

10. The system of claim 8, wherein the bulkhead graphical user interface is touch sensitive.

11. The system of claim 8, wherein the first display comprises a cabin light icon, a thermostat icon, and a window shade icon.

12. The system of claim 8, wherein the second display comprises a slider that responds to a sliding motion across a touch-sensitive surface of the bulkhead graphical user interface.

13. The system of claim 8, wherein the first cabin zone comprises at least one of a crew seating area, a passenger seating area, a bedroom, and a conference room between the two bulkheads in the cabin of the aircraft.

14. A non-transitory, executable, computer program product providing instructions for a method of operation of a system incorporating a bulkhead graphical user interface disposed in a bulkhead within a cabin of an aircraft, the bulkhead dividing the cabin lengthwise into cabin zones, wherein the system comprises a processor, a controller operatively connected to the processor, and the bulkhead graphical user interface connected to the controller, wherein the instructions comprise:

displaying a menu of at least one controllable parameter on the bulkhead graphical user interface, wherein the bulkhead graphical user interface is disposed within the bulkhead adjacent to a first cabin zone;

receiving, by the controller, a selected controllable parameter from the menu of the at least one controllable parameter on the bulkhead graphical user interface;

displaying at least one control for the selected controllable parameter on the bulkhead graphical user interface;

receiving, by the controller, a control input for the selected controllable parameter from the bulkhead graphical user interface;

adjusting, by the controller, the selected controllable parameter within the first cabin zone, independently from a second cabin zone, consistent with the control input, wherein the selected controllable parameter comprises at least one of cabin light intensity, cabin light color, temperature, and the degree of openness of at least one window shade; and prioritizing, by the controller, the control input received from the bulkhead graphical user interface in relation to control inputs received from another input device, thereby avoiding conflicts between the control inputs, wherein the first cabin zone extends between two bulkheads in the cabin of the aircraft.

15. The non-transitory, executable, computer program product of claim 14, wherein the bulkhead comprises at least one interior wall within the cabin of the aircraft.

16. The non-transitory, executable, computer program product of claim 14, wherein the instructions further comprise:

placing the bulkhead graphical user interface into a sleep mode if the selected controllable parameter is not received.

17. The non-transitory, executable, computer program product of claim 14, wherein the first cabin zone comprises at least one of a crew seating area, a passenger seating area, a bedroom, and a conference room between the two bulkheads in the cabin of the aircraft.

18. An aircraft, comprising:

a cabin;

a first cabin zone located between a first bulkhead and a second bulkhead;

a second cabin zone located between the second bulkhead and a third bulkhead, wherein the first, second, and third bulkheads divide the cabin lengthwise into the first and second cabin zones;

a processor;

a controller operatively connected to the processor;

a first bulkhead graphical user interface operatively connected to the controller, the first bulkhead graphical user interface being disposed in the first bulkhead adjacent to the first cabin zone, wherein the first bulkhead graphical user interface is operative for receiving a control input associated with at least one controllable parameter selected from a group consisting of cabin light intensity, cabin light color, temperature, and the degree of openness of at least one window shade, and wherein, consistent with the control input, the controller adjusts the at least one controllable parameter selected within the first cabin zone, independently from the second cabin zone, and a second bulkhead graphical user interface operatively connected to the controller, the second bulkhead graphical user interface being disposed in the second bulkhead adjacent to the second cabin zone, wherein the second bulkhead graphical user interface is operative for receiving the control input associated with the at least one controllable parameter, and wherein, consistent with the control input, the controller adjusts the at least one controllable parameter selected within the second cabin zone, independently from the first cabin zone.

19. The aircraft of claim 18, wherein the bulkhead graphical user interface is touch sensitive.

20. The aircraft of claim 18, wherein the controller prioritizes the control input received from the first and second bulkhead graphical user interfaces in relation to control inputs received from another input device, thereby avoiding conflicts between the control inputs.

21. The aircraft of claim 18, wherein each bulkhead graphical interface comprises a first display comprising a cabin light icon, a thermostat icon, and a window shade icon.

22. The aircraft of claim 21, wherein each bulkhead graphical user interface comprises a second display comprising a slider that responds to a sliding motion across a touch-sensitive surface of the bulkhead graphical user interface.

23. The aircraft of claim 18, wherein the first cabin zone and the second cabin zone comprises at least one of a crew seating area, a passenger seating area, a bedroom, and a conference room between the two bulkheads in the cabin of the aircraft.

24. The aircraft of claim 18, wherein the first bulkhead and the second bulkhead each comprise at least one interior wall within the cabin of the aircraft.

25. The aircraft of claim 18, wherein the first and second bulkhead graphical user interfaces are placed into a sleep mode if the control input is not received.

26. The aircraft of claim 18, wherein cabin light intensity, temperature, and degree of openness of the at least one window shade are adjustable between a predetermined minimum and a predetermined maximum.

* * * * *